United States Patent
Mokuya

(10) Patent No.: US 8,549,593 B2
(45) Date of Patent: Oct. 1, 2013

(54) NETWORK ACCESS CONTROL SYSTEM AND METHOD

(75) Inventor: Senichi Mokuya, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 695 days.

(21) Appl. No.: 12/702,225

(22) Filed: Feb. 8, 2010

(65) Prior Publication Data

US 2010/0205655 A1    Aug. 12, 2010

(30) Foreign Application Priority Data

Feb. 10, 2009  (JP) .................................. 2009-028909

(51) Int. Cl.
*G06F 7/04* (2006.01)
*G06F 15/16* (2006.01)
*G06F 17/30* (2006.01)
*H04L 29/06* (2006.01)

(52) U.S. Cl.
USPC ............................................. 726/6; 370/338

(58) Field of Classification Search
None
See application file for complete search history.

(56) References Cited

U.S. PATENT DOCUMENTS

| | | | |
|---|---|---|---|
| 7,263,612 B2* | 8/2007 | Yamazaki et al. | 713/168 |
| 2003/0131082 A1 | 7/2003 | Kachi | |
| 2005/0169214 A1* | 8/2005 | Suomela | 370/331 |
| 2006/0205354 A1* | 9/2006 | Pirzada et al. | 455/66.1 |
| 2006/0251256 A1* | 11/2006 | Asokan et al. | 380/270 |
| 2007/0201087 A1 | 8/2007 | Saito | |
| 2008/0062958 A1* | 3/2008 | Jonsson et al. | 370/350 |
| 2009/0158034 A1* | 6/2009 | Gu et al. | 713/156 |

FOREIGN PATENT DOCUMENTS

| | | |
|---|---|---|
| JP | 2003-204338 A | 7/2003 |
| JP | 2003-304252 A | 10/2003 |
| JP | 2003-308297 A | 10/2003 |
| JP | 2004-235890 A | 8/2004 |
| JP | 2006-060589 A | 3/2006 |
| JP | 2008-165719 A | 7/2008 |

* cited by examiner

*Primary Examiner* — Nadia Khoshnoodi
(74) *Attorney, Agent, or Firm* — Kilpatrick Townsend & Stockton LLP

(57) ABSTRACT

A network access control system includes an information device that has access to a relay device which relays communication in a communication network, by the use of access information, and performs communication via the relay device, and a management unit that finds information devices, wherein when the found information device has no access to the relay device and is a second information device which is allowed to have access to the relay device by a first information device, the management unit transmits the access information to the second information device without a request for authentication.

5 Claims, 14 Drawing Sheets

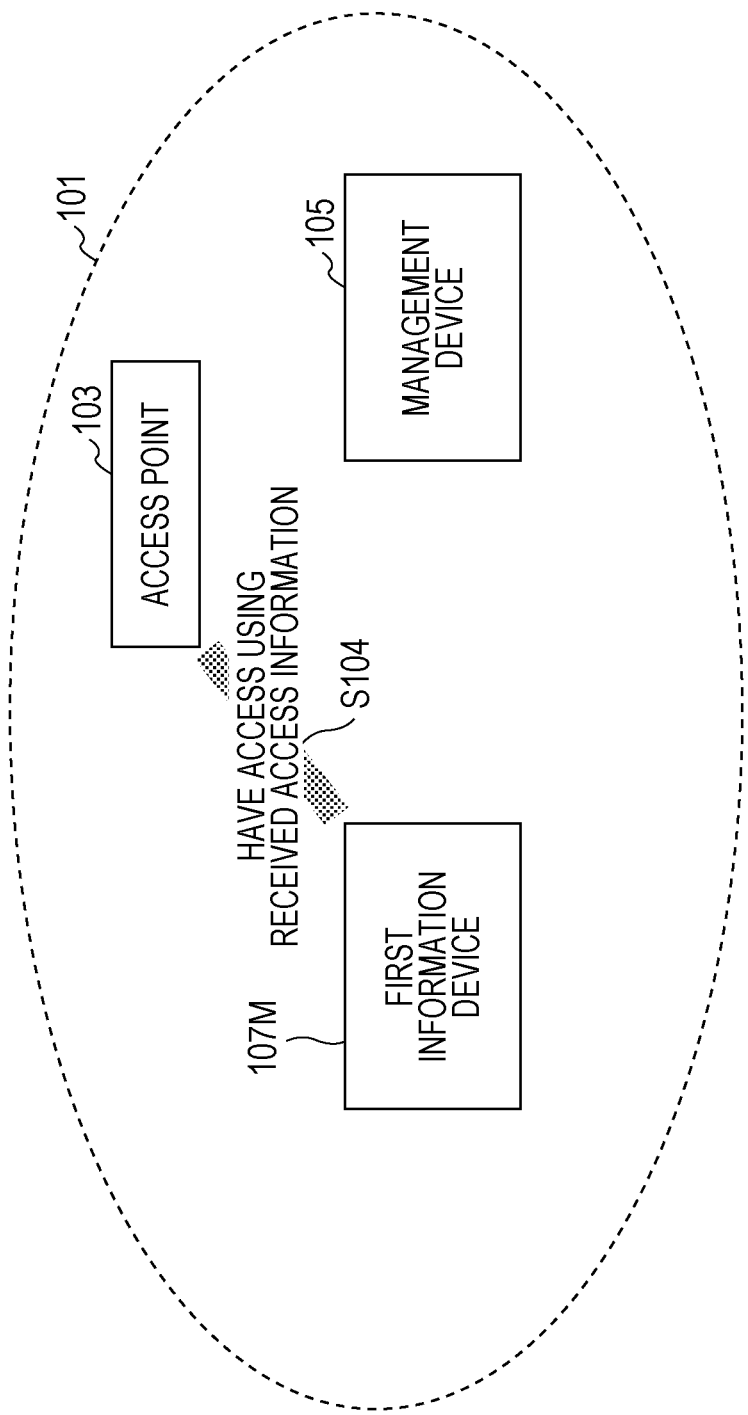

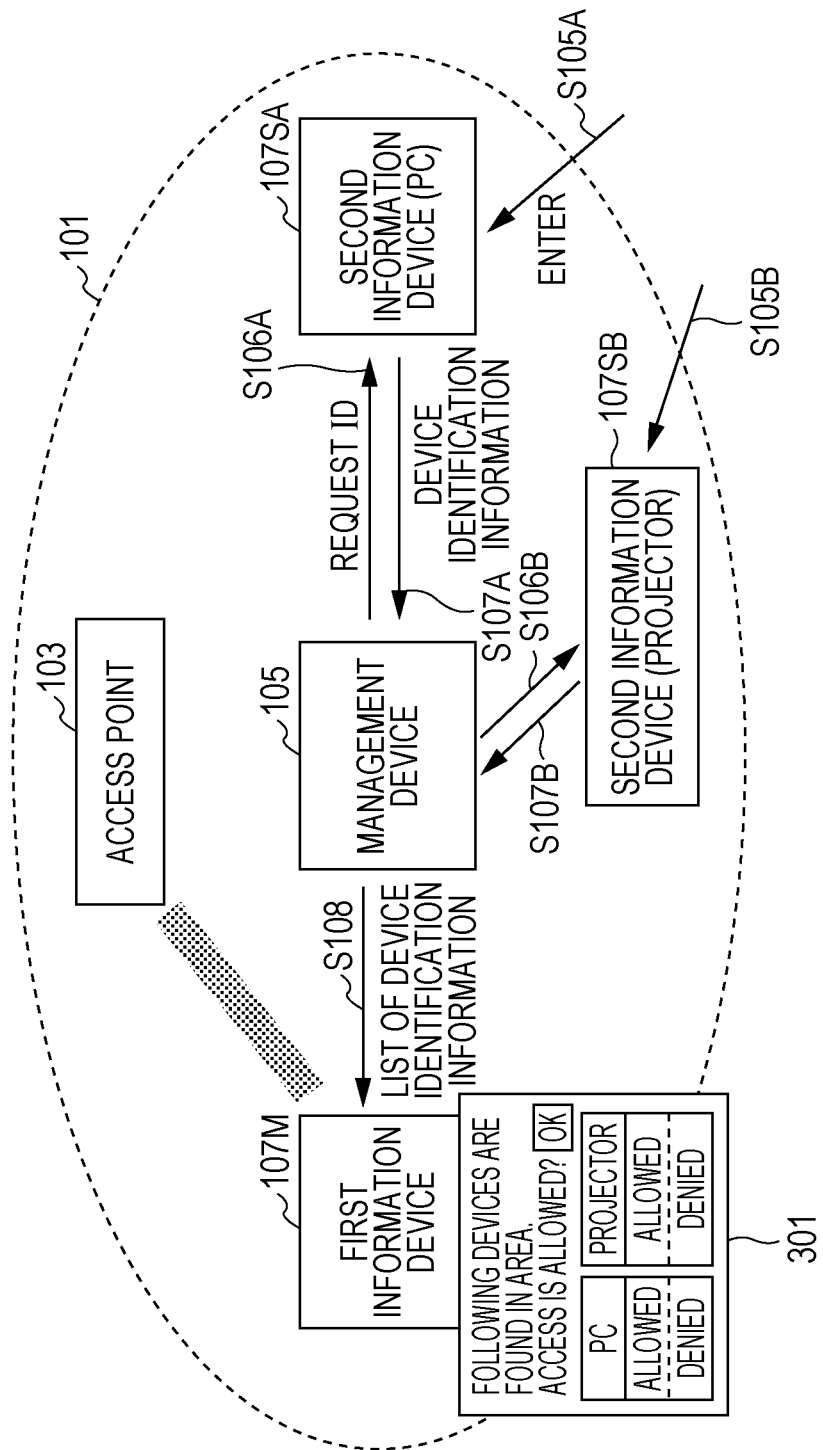

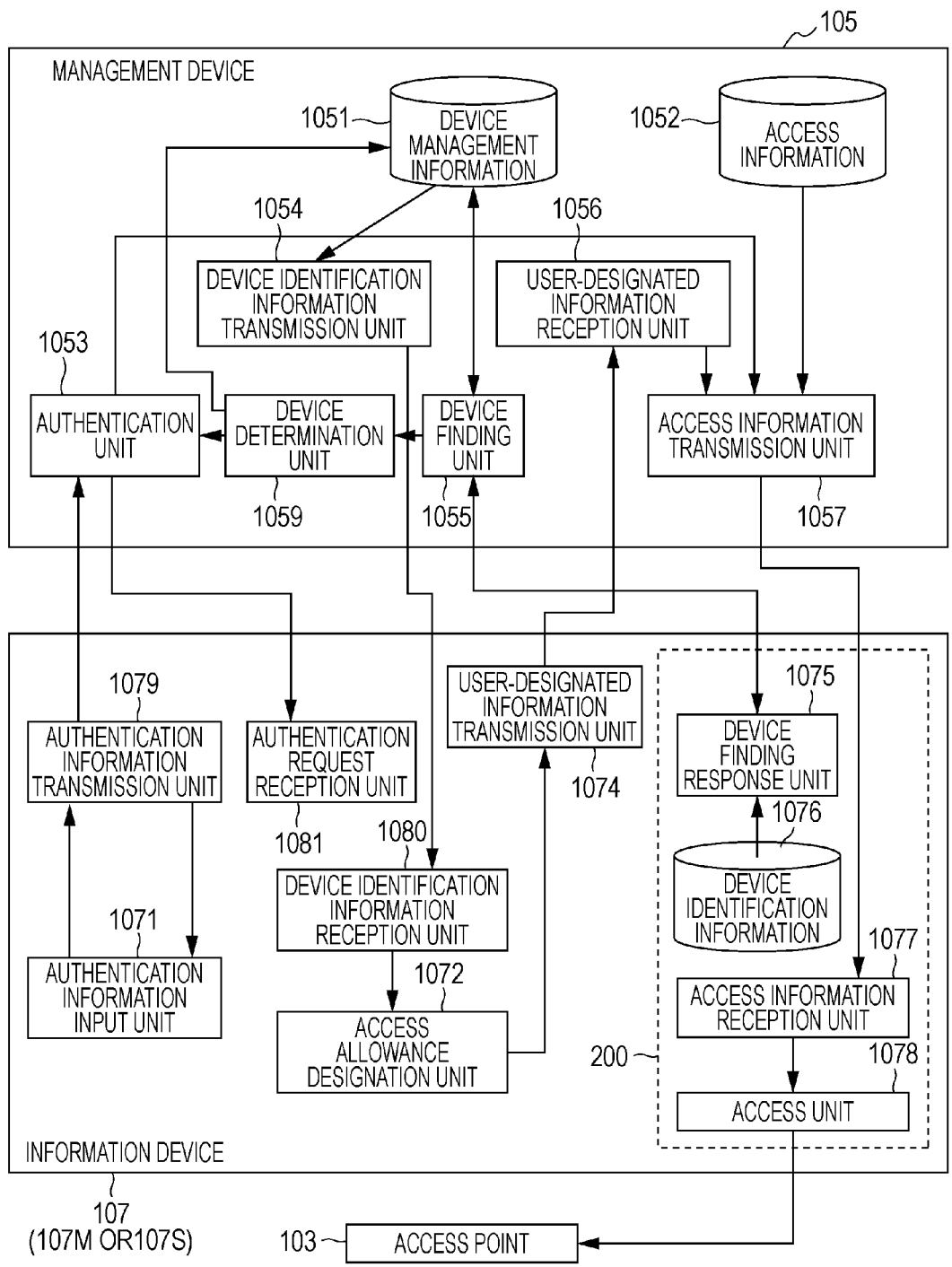

| MAC ADDRESS | 00-01-02-ff-ab-cd |
|---|---|
| COMPUTER NAME (Windows) | PC OF XXX |
| LOG ON NAME (Windows) | SUZUKI |
| DEVICE IDENTIFIER (GIVEN BY USER) | PC001 |
| USER'S NAME (GIVEN BY USER) | SUZUKI |
| USER'S FACE IMAGE (GIVEN BY USER) |  |

401

403

| DEVICE IDENTIFIER | CLASSIFICATION | RESULT OF ALLOWANCE OR NOT | DETAILED INFORMATION ABOUT DEVICE |
|---|---|---|---|
| PC001 | FIRST | — | ... |
| PC003 | SECOND | ALLOWED | ... |
| PC004 | SECOND | DENIED | ... |
| PJ099 | SECOND | NOT DETERMINED | ... |

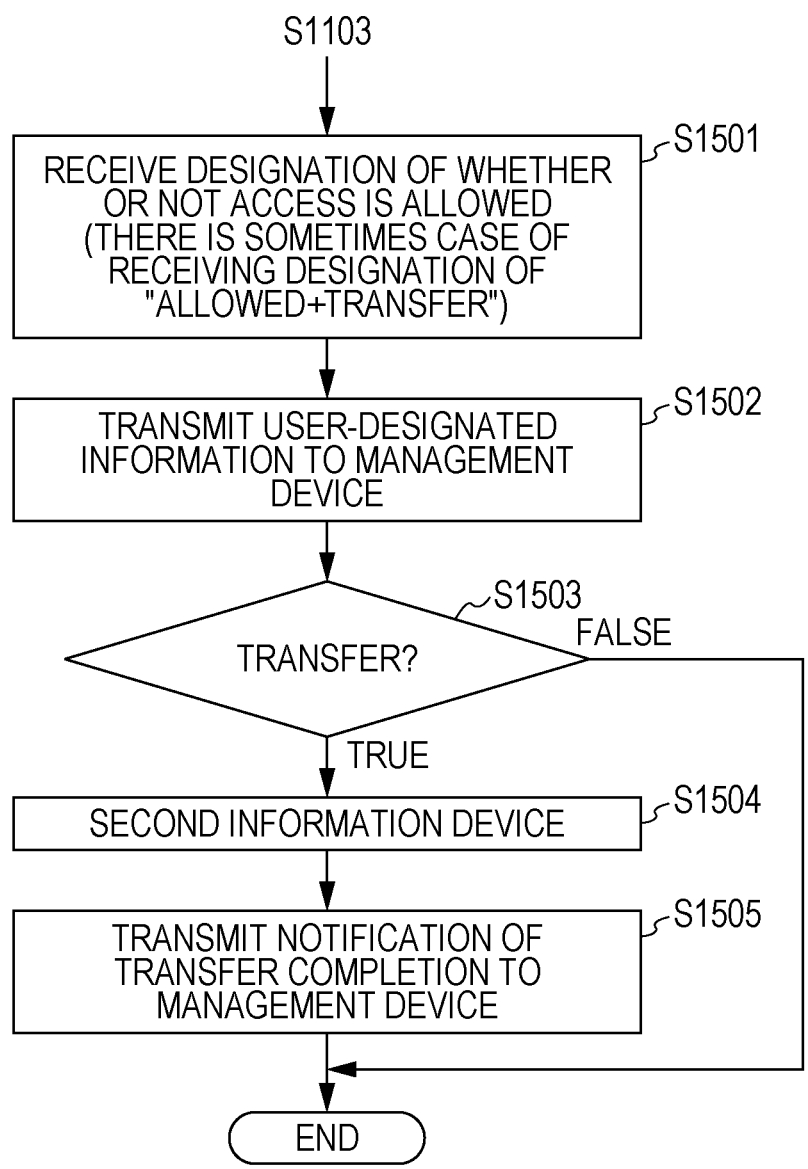

NETWORK ACCESS CONTROL SYSTEM AND METHOD

BACKGROUND

1. Technical Field

The present invention relates to a technique for controlling access to a relay device which relays communication in a communication network.

2. Related Art

Wireless communication is a kind of communication in a communication network. JP-A-2006-60589 discloses a group management system which is a relay device relaying communication in a wireless communication network. When the group management system detects an information device existing in a predetermined range, it carries out a user authentication of the information device and transmits a private key to the information device if the user authentication is successful. This enables the information device to wirelessly communicate with the group management system.

According to the technique disclosed in JP-A-2006-60589, the wireless communication with the group management system is determined depending on whether or not the user authentication is successful. For this reason, users of all of information devices are required to input information needed for user authentication (hereinafter, referred to as "user authentication information") whenever they enter a predetermined range.

In order to solve this problem, a method can be considered in which, for example, the information device stores the user authentication information in advance and transmits the stored user authentication information to the group management system upon entering a predetermined range. However, in this method, the group management system is required to store the user authentication information of all users in advance, in order to allow wireless communication. Thereby, this method cannot be adopted in the case where the users to whom communication is allowable are not determined in advance.

The problems described above may also occur with communication other than wireless communication.

SUMMARY

An advantage of some aspects of the invention is that even if the users to whom communication is allowable are not determined in advance, a secure access to a relay device is performed without all users inputting the information needed for access to the relay device which relays communication in a communication network.

A management unit which finds information devices is provided. When the found information device has no access to a relay device and is a second information device which is allowed to have access to the relay device by a first information device, the management unit transmits access information to the second information device without making a request for authentication to the second information device.

In detail, for example, the first information device is an initially found information device and the second information device is an information device which is found after the first information device (hereinafter, a user of the first information device is referred to as "first user" and a user of the second information device is referred to as "second user"). When the found information device is the first information device, the management unit makes a request for authentication to the first information device and authenticates the first information device by the use of authentication information sent from the first information device in response to the request; and if the authentication is successful, it transmits access information for access to the relay device to the first information device. The first information device gains access to the relay device by the use of the access information. On the other hand, when the found information device is the second information device, the management unit transmits device identification information of the second information device to the authenticated first information device. The first information device displays the device identification information of the second information device, receives a designation of whether or not the second information device is allowed to have access to the relay device by the first information device and notifies the management unit of information about the second information device which has been allowed to access. The management unit transmits the access information to the second information device which has been allowed to access by the first user, among the found second information devices. The second information device has access to the relay device by the use of the access information.

The management unit may be provided in the relay device or a device separate from the information device (for example, the management device 105 described in the embodiments), or may be provided in the relay device or the first information device. When the management unit is provided in the first information device, in the above-described example, the initial self-authentication to the management unit may be canceled.

BRIEF DESCRIPTION OF THE DRAWINGS

The invention will be described with reference to the accompanying drawings, wherein like numbers reference like elements.

FIG. 1B illustrates a second part of an outline of a processing according to an embodiment of the invention.

FIG. 2A illustrates a third part of an outline of a processing according to an embodiment of the invention.

FIG. 3 illustrates a functional block of a management device and an information device.

FIG. 12 illustrates a modified example of the processing D.

DESCRIPTION OF EXEMPLARY EMBODIMENTS

An embodiment of the present invention will now be described, taking a case of a communication network that is a wireless LAN as an example.

An outline of an embodiment according to the present invention will be described with reference to FIGS. 1A, 1B, 2A and 2B.

As shown in FIGS. 1A to 2B, one management device 105 is installed for one access point 103. The management device 105 stores information (hereinafter, referred to as "access information") needed for access to the access point 103 corresponding to the management device 105 in advance. The access information is an SSID (Service Set Identifier) and a WEP (Wired Equivalent Privacy), for example. The management device 105 is a device which can perform wireless communication, like the access point 103. In addition, the dotted range 101 indicates an area (hereinafter, referred to as "management communication area") where the management device 105 can communicate. The management device 105 can find an information device, which has entered the management communication area 101, with a near field communication, for example. When finding the information device, the management device 105 determines whether the information device is the first information device or the second information device. In this embodiment, "the first information device" refers to an information device which is found initially, and "the second information device" refers to an information device which is found following the first information device.

Figure 1A:
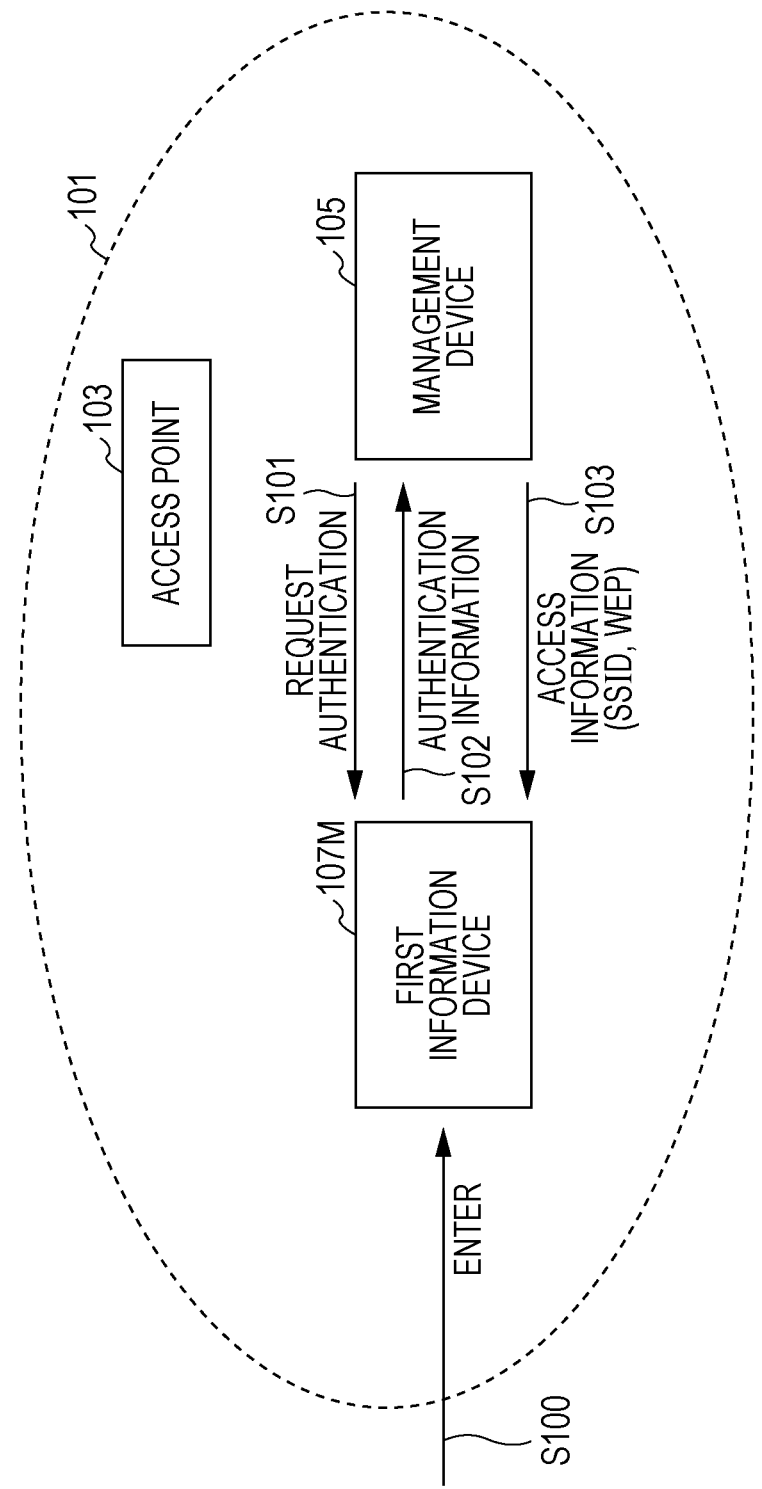
FIG. 1A illustrates a first part of an outline of a processing according to an embodiment of the invention.

As shown in FIG. 1A, a certain information device 107M is assumed to initially enter the management communication area 101. The management device 105 finds the information device 107M which has entered the management communication area 101.

The information device 107M is an initially found information device and thus is determined as the first information device by the management device 105. In this case, the management device 105 transmits a request for authentication to the first information device 107M (S101). The first information device 107M transmits authentication information (for example, an ID and password input by a user) to the management device 105 in response to the request for authentication (S102).

The management device 105 determines whether or not the authentication information from the first information device 107M is right. If it is determined that the authentication information is the right information, the management device 105 transmits access information stored therein to the first information device 107M (S103). When the first information device 107M receives the access information, it has access to the access point 103 by the use of the received access information (S104), as shown in FIG. 1B.

Thereafter, as shown in FIG. 2A, information devices 107SA and 107SB are assumed to enter the specific area 101 (S105A and S105B). The management device 105 finds each of the information devices 107SA and 107SB. In this example, it is assumed that the second information device 107SA is a PC (Personal Computer) and the second information device 107SB is a projector.

The PC 107SA and the projector 107SB are information devices which are found following the first information device 107M and thus are determined as the respective second information devices by the management device 105. In this case, the management device 105 transmits a request for ID to the PC 107SA and the projector 107SB, respectively (S106A and S106B). The PC 107SA and the projector 107SB transmit device identification information in response to the request for ID, respectively (S107A and S107B). The device identification information refers to information for identifying information devices. The management device 105 transmits the received device identification information to the first information device 107M (S108).

The first information device 107M displays a list of the received device identification information and also receives a designation (hereinafter, referred to as "access allowance designation") of whether or not the second information device corresponding to each of the device identification information has access to the access point 103 (whether the access is "allowed" or "denied"). For example, when the first information device 107M is a PC (Personal Computer), the PC displays the GUI (Graphical User Interface) 301 having the list of the received device identification information and a tool for receiving the access allowance designation on the display screen of the PC, as shown in FIG. 2A.

Figure 2B:
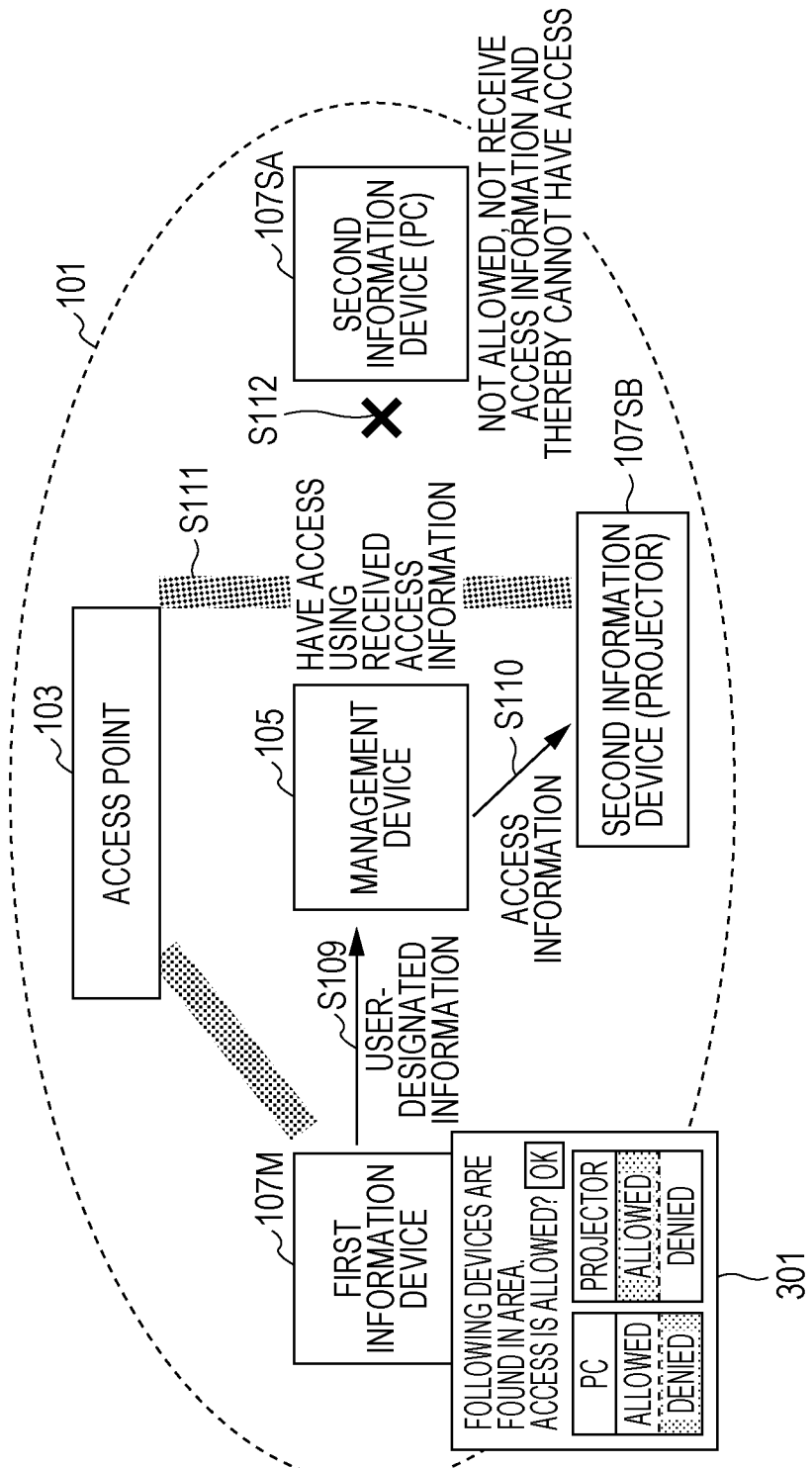
FIG. 2B illustrates a fourth part of an outline of a processing according to an embodiment of the invention.

When receiving the access allowance designation, the first information device 107M transmits user-designated information (for example, information indicating which second information device is designated as "allowed") indicating the access allowance designation, to the management device 105. In detail, as shown in FIG. 2B, it is assumed that the PC 107SA is designated as "denied" and the projector 107SB is designated as "allowed" via the GUI 301. The first information device 107M transmits the user-designated information indicating that the PC 107SA is designated as "denied" and the projector 107SB is designated as "allowed" to the management device 105 (S109).

The management device 105 receives the user-designated information from the first information device 107M and specifies the second information device designated as "allowed" and the second information device designated as "denied" on the basis of the user-designated information.

In this example, as shown in FIG. 2B, the projector 107SB is specified as the second information device designated as "allowed" and therefore the management device 105 transmits the access information to the projector 107SB (S110). At this time, the management device 105 does not transmit the request for authentication to the projector 107SB. The projector 107SB has access to the access point 103 by the use of the received access information (S111).

On the other hand, as shown in FIG. 2B, the PC 107SA is specified as the second information device designated as "denied" and therefore the management device 105 does not transmit the access information to the PC 107SA. Thereby, the PC 107SA cannot have access to the access point 103 as denoted by S112.

The outline of an embodiment according to the present invention has been described above. In this description, for example, the information devices 107M and 107SB having received the access information from the management device 105 are inside the management communication area 101; however, when they are outside a communication area of the access point 103 (hereinafter, referred to as "access communication area"), they enter the access communication area and can then have access thereto by the use of the above-described received access information. For this reason, it is preferable that the management communication area 101 is exactly the same as the access communication area or is included in the access communication area.

According to the above description, for the second information device 107SB which is found after the first information device 107M, even when a user of the second information device 107SB does not intentionally input the access information, access can be gained to the access point 103.

In addition, the first information device 107M has been authenticated, and the user of the authenticated first information device 107M determines whether or not the second information devices 107SA and 107SB are allowed to have access to the access point 103. Thereby, it is possible to achieve a secure access. Further, it is possible to prevent the second information device which is found but is not required to have access from having access to the access point 103. In detail, for example, when only information devices of users who participate in a conference at a conference room are allowed to have access, even if information devices of users who are present at the conference room or in the vicinity thereof but do not participate in the conference are found, it is possible to prevent them from having access to the access point 103.

The present embodiment will now be described in detail.

FIG. 3 illustrates a functional block of the management device 105 and the information device 107. In addition, the reference numeral 107S in FIG. 3 denotes the second information device.

The management device 105 includes an authentication unit 1053, a device identification information transmission unit 1054, a device finding unit 1055, a user-designated information reception unit 1056, an access information transmission unit 1057 and a device determination unit 1059. These units can be realized by a processor (for example, a CPU (Central Processing Unit)) in the management device 105 executing a computer program (or by implementing a portion or the whole thereof with hardware). Furthermore, the management device 105 includes a storage unit 1051 for storing device management information and a storage unit 1052 for storing access information. Such storage units can be realized by storage resources (for example, volatile and/or nonvolatile memory) in the management device 105. In detail, the storage unit 1051 may be a volatile storage resource and the storage unit 1052 may be a nonvolatile storage resource.

Figures 4A, 4B:
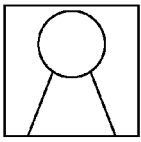
FIG. 4A illustrates a detailed example of device identification information.
FIG. 4B illustrates a detailed example of device management information.

The device finding unit 1055 finds an information device which is in the management communication area 101, by the use of Near Field Communication or the like. In detail, for example, the device finding unit 1055 sends a specific signal (hereinafter, referred to as a "search signal") periodically (or non-periodically) and receives a specific response to the search signal. A transmission source of the response is the found information device. The device finding unit 1055 receives device identification information of the found information device from the information device. A detailed example of the device identification information is shown in FIG. 4A. In other words, the device identification information 401 contains, for example, an MAC (Media Access Control) address, a computer name, a log on name, a device identifier, a user name and a user face image of the information device 107. In addition, a portion or the whole thereof may be located at other places than the information device 107. In this case, the device identification information 401 contains link information (for example, URL (Uniform Resource Locator)) about the other places.

The device determination unit 1059 determines whether the found information device is an initially found information device (i.e., the first information device) or is an information device which is found after the first information device (i.e., the second information device), on the basis of the device identification information received by the device finding unit 1055 and the device management information in the storage unit 1051. If the device determination unit 1059 determines that the found information device is the first information device, it adds the received device identification information to the device management information and instructs the authentication unit 1053 for authentication. In contrast, if the found information device is determined to be the second information device and further the device management information does not include the device identification information of this information device, the device determination unit 1059 adds the received device identification information to the device management information. A detailed example of the device management information is shown in FIG. 4B. In other words, the device management information 403 contains a device identifier, a classification, a result of whether the device is allowed or not and detailed information about the device, for each of the found information devices. The device identifier is the same as the device identifier in the device identification information, and the detailed information about the device is information other than the device identifier, the classification and the result of whether the device is allowed or not in the device identification information. The classification indicates whether the information device is the first information device or the second information device. The result of whether the device is allowed or not indicates whether or not access to the access point 103 is allowed. In addition, the classification for an information device which has not undergone the access allowance designation yet has a value of "not determined." In detail, when the device determination unit 1059 adds the device identification information of the second information device 107S to the device management information 403, the classification corresponding to the added device identification information is referred to as "not determined."

The device identification information transmission unit 1054 transmits, to the authenticated first information device, the device identification information (the identification information of the second information device 107S) corresponding to "not determined" of the result of whether the device is allowed or not in the device identification information contained in the device management information 403.

When receiving the instruction of authentication, the authentication unit 1053 transmits the request for authentication to the found first information device 107M. The authentication unit 1053 receives authentication information sent by the first information device 107M responding to the request for authentication, and then determines whether or not the authentication information is right. If it is determined that the authentication information is right, the authentication unit 1053 instructs the access information transmission unit 1057 to transmit the access information to the first information device 107M.

The user-designated information reception unit 1056 receives the user-designated information from the first information device 107M. When the user-designated information reception unit 1056 specifies the second information device corresponding to "allowed" based on this information, it instructs the access information transmission unit 1057 to transmit the access information to this second information device.

The access information transmission unit 1057 transmits the access information stored in the storage unit 1052 to the found first information device 107M or second information device 107S, in response to the instruction from the authentication unit 1053 or the user-designated information reception unit 1056. In addition, the access information transmission unit 1057 may obtain access information from the access point 103 each time access information is necessary and transmit this access information.

The information device 107 includes functions shown inside the dotted range 200 which are common functions of the first and second information devices, that is, a device finding response unit 1075, a storage unit (for example, a non-volatile storage resource) 1076 for storing device identification information of this information device, an access information reception unit 1077 and an access unit 1078. The device finding response unit 1075 returns a specific response to the search signal from the management device 105 (the device finding unit 1055) and thereafter transmits the device identification information stored in the storage unit 1076 to the management device 105 in response to the request from the management device 105 (the device finding unit 1055). The access information reception unit 1077 receives the access information from the management device 105. The access unit 1078 has access to the access point 103 by the use of this access information.

The information device 107 includes functions shown outside the dotted range 200 which are functions unique to the first information device, that is, an authentication request reception unit 1081, an authentication information input unit 1071, an authentication information transmission unit 1079, a device identification information reception unit 1080, an access allowance designation unit 1072 and a user-designated information transmission unit 1074.

The authentication request reception unit 1081 receives the request for authentication from the management device 105 (the authentication unit 1053).

The authentication information input unit 1071 inputs the authentication information in response to the request for authentication. For example, the authentication information input unit 1071 instructs a user to input the authentication information in response to the request for authentication and accepts the input of the authentication information from the user in response to the instruction.

The authentication information transmission unit 1079 transmits the input authentication information to the management device 105 (the authentication unit 1053).

The device identification information reception unit 1080 receives the device identification information of the second information device from the management device 105 (the device information transmission unit 1054).

The access allowance designation unit 1072 displays a list of the received device identification information of the second information devices on a display screen (not shown) of this information device, and receives, from the user, the designation ("access allowance designation") of whether or not the second information device corresponding to each piece of the displayed device identification information is allowed to have access to the access point 103.

The user-designated information transmission unit 1074 transmits the information (that is, the user-designated information) indicating a result of the access allowance designation to the management device 105 (the user-designated information reception unit 1056).

A flow of the processing carried out according to this embodiment will now be described.

Figure 5:
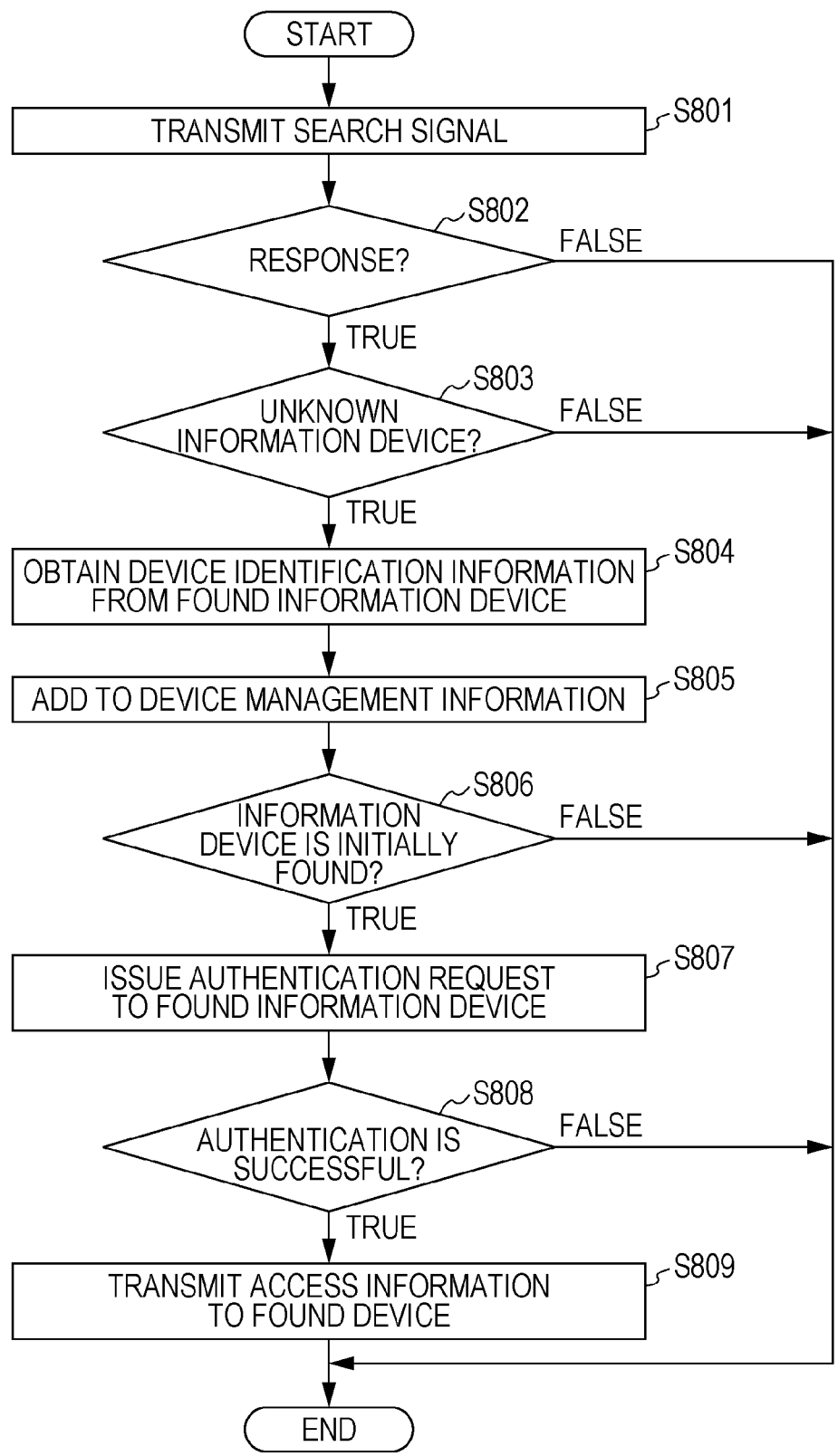
FIG. 5 illustrates a flow of a processing A executed by the management device.

FIG. 5 illustrates a flow of a processing (hereinafter, referred to as "processing A") executed by the management device 105. The processing A is executed periodically, for example.

The device finding unit 1055 sends the search signal (S801). If there is a response to this search signal (S802: TRUE), the device finding unit 1055 determines whether or not an information device which is the source having transmitted the response is an unknown information device (an information device which has not been found yet) (S803). In detail, for example, the device finding device 1055 receives a portion of information (for example, the MAC address) in the device identification information as the response and determines whether or not this information is contained in the device management information 403. If a result of this determination is negative, a result of the determination at step S803 becomes affirmative.

If the result of the determination at step S803 is affirmative (S803: TRUE), the device finding unit 1055 receives the device identification information from the found information device 107 (S804) and adds this device identification information to the device management information 403 (S805).

Thereafter, the device determination unit 1059 determines whether or not the found information device is an initially found information device (the first information device) with reference to the device management information 403 (S806).

If a result of the determination at step S806 is affirmative (S806: TRUE), the authentication unit 1053 transmits the request for authentication to the found information device (the first information device) 107M (S807). When receiving the authentication information in response to the request for authentication, the authentication unit 1053 determines whether or not the authentication information is right (S808). If the authentication information is the right information (that is, if the authentication is successful) (S808: TRUE), the access information transmission unit 1057 transmits the access information to the found information device 107M (S809).

Figure 6:
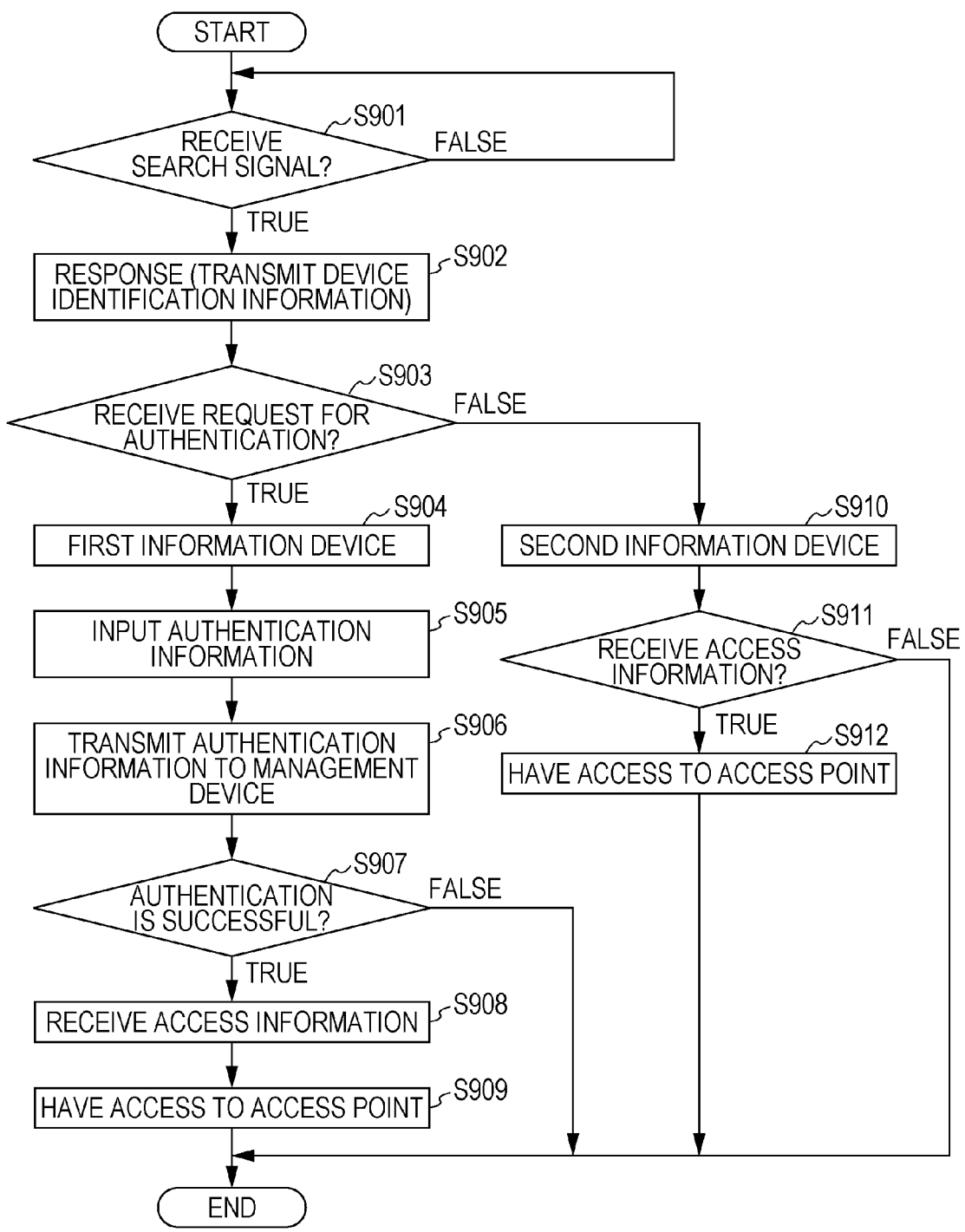
FIG. 6 illustrates a flow of a processing B executed by the information device.

FIG. 6 illustrates a flow of a processing (hereinafter, referred to as a "processing B") executed by the information device 107.

When receiving the search signal from the management device 105 (S901: TRUE), the device finding response device 1075 returns a response thereto (S902). In addition, when the device finding response unit 1075 receives a request for the device identification information after returning the response, it transmits the device identification information to the management device 105.

After step 902, if the authentication request reception unit 1081 receives the request for authentication (S903: TRUE), the information device 107 becomes the first information device 107M (S904). For example, the information device 107 writes role information which means that it becomes the first information device, in any storage zones of the device. Thereafter, the authentication information input unit 1071 inputs the authentication information (S905) and the authentication information transmission unit 1079 transmits the input authentication information to the management device 105 (S906). If the authentication is successful (S907: TRUE), the access information reception unit 1077 receives the access information (S908) and the access unit 1078 has access to the access point 103 by the use of this access information (S909).

On the other hand, after step S902, if not receiving the request for authentication (for example, if not receiving the request for authentication even after the elapse of a certain time, or if receiving information meaning the second information device from the management device 105) (S903: FALSE), this information device 107 becomes the second information device. For example, the information device 107 writes role information which means that it becomes the second information device, in any storage zones of this device. Thereafter, if the access information reception unit 1077 receives the access information (S911: TRUE), the access unit 1078 has access to the access point 103 by the use of the access information (S912).

Figure 7:
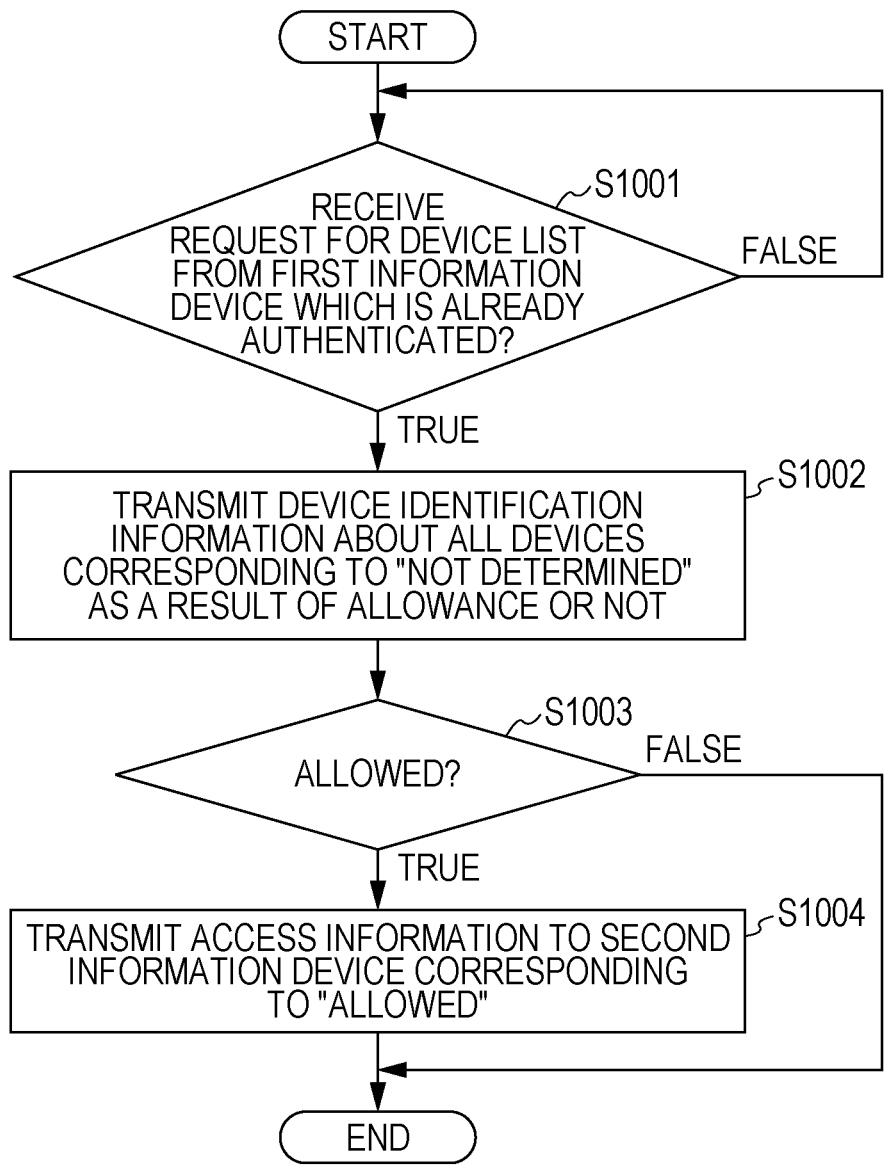
FIG. 7 illustrates a flow of a processing C executed by the management device.

FIG. 7 illustrates a flow of another processing (hereinafter, referred to as a "processing C") executed by the management device 105.

When the device identification information transmission unit 1054 receives a request for the device list from the authenticated first information device 107M (S1001: TRUE), it transmits, to the first information device 107M, all pieces of the device identification information (the device identification information of the second information devices) corresponding to the "not determined" result of whether the device is allowed or not in the device management information 403 (S1002).

Next, the user-designated information reception unit 1056 receives the user-designated information from the first information device 107M. When the user-designated information reception unit 1056 specifies that information about the second information device corresponding to "allowed" is contained in the received user-designated information (S1003: TRUE), the access information transmission unit 1057 transmits the access information to the second information device corresponding to "allowed" (S1004). In other words, the access information is not transmitted to the second information device corresponding to "denied" (S1004).

Figure 8:
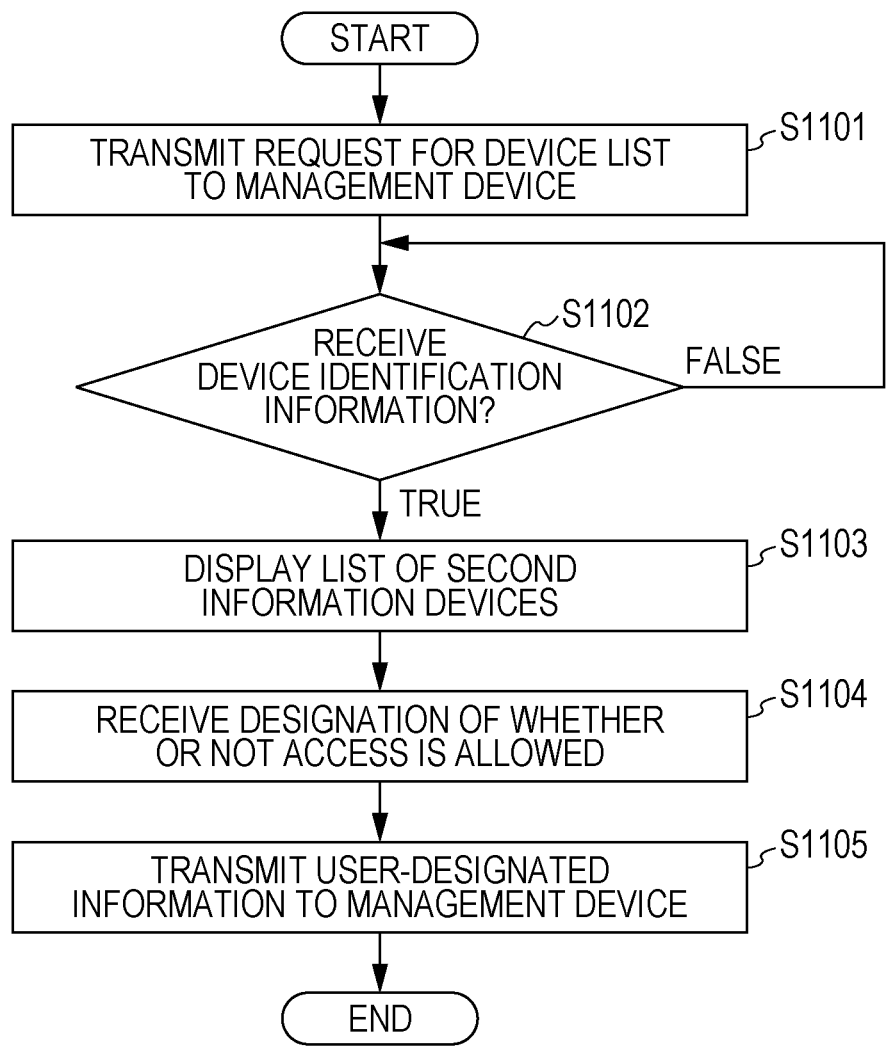
FIG. 8 illustrates a flow of a processing D executed by a first information device.

FIG. 8 illustrates a flow of a processing (hereinafter, referred to as a "processing D") executed by the first information device 107M. The processing D is executed by an information device where role information which means that it becomes the first information device is written in any storage zones thereof.

The first information device 107M (for example, the device identification information reception unit 1080) transmits the request for the device list to the management device 105 in a periodical manner (or in response to the instruction from the user) (S1101). The request for the device list is a request for all pieces of the device identification information corresponding to the "not determined" result of whether the device is allowed or not.

Figure 9:
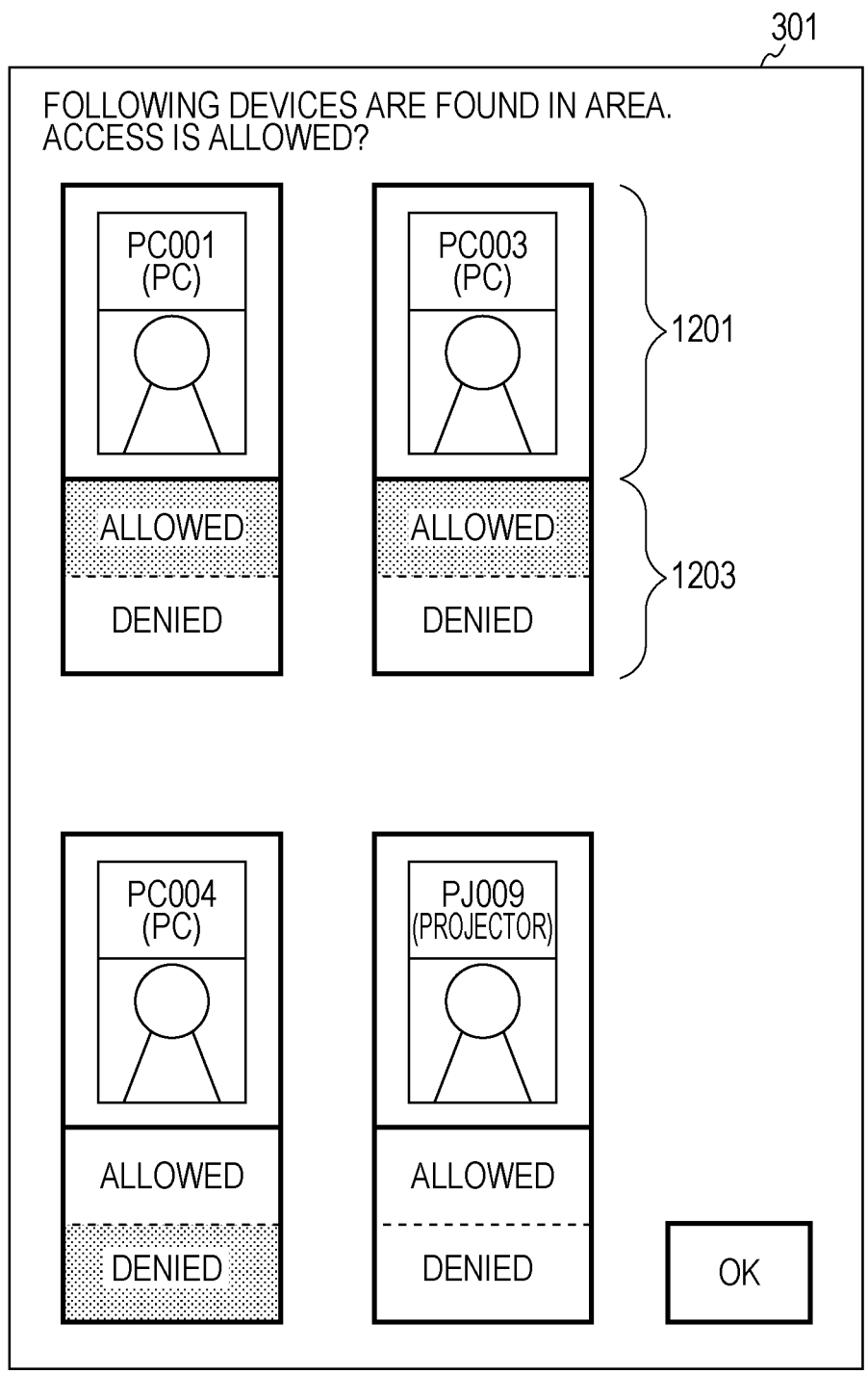
FIG. 9 illustrates an example of a GUI displayed on the first information device.

If the device identification information reception unit 1080 receives the device identification information in response to the request for the device list (S1102: TRUE), the access allowance designation unit 1072 displays the received list of the device identification information (S1103). In detail, for example, as shown in FIG. 9, the access allowance designation unit 1072 displays the GUI 301 having each piece of the received device identification information 1201 and the tool 1203 which enables the access of the second information device corresponding to each piece of the device identification information to the access point 103 to be "allowed" or "denied" on the display screen. The user watches the device identification information, determines whether the second information device corresponding to this information is "allowed" or "denied" to have access to the access point 103, and designates "allowed" or "denied" by the use of the tool 1203. In addition, the designation of "allowed" or "denied" is not limited to the method of using the GUI 301 but may adopt various methods such as, for example, a touch panel operation, or an operation of input devices or the like separate from the display screen.

The access allowance designation unit 1072 receives, from the user, the access allowance designation of whether the second information device corresponding to each of the displayed device identification information is "allowed" or "denied" to have access to the access point 103 (S1104). If the access allowance designation is received, the user-designated information transmission unit 1074 transmits the user-designated information indicating this access allowance designation to the management device 105 (S1105). The user-designated information includes information about the second information device corresponding to "allowed" and information about the second information device corresponding to "denied," the information thereabout being based on the device identification information of the second information device.

An embodiment according to the invention has been described above.

In this embodiment, the device management information transmitted to the first information device 107M from the management device 105 is only the device management information corresponding to the "not determined" result of whether the device is allowed or not; however, in addition thereto, the device management information corresponding to the "allowed" and/or "denied" result of whether the device is allowed or not may be transmitted. If the second information device which finishes the access to the access point 103 is designated as "denied," the management device 105 transmits a request for disconnection to this second information device, and the second information device may disconnect the access to the access point 103 in response to the request for disconnection.

In addition, the functions of the management device 105 may be provided in the access point 103 or the first information device, instead of the management device 105. When the first information device has the functions of the management device 105, the authentication of the first information device is not necessary. Further, in this case, a storage resource of the first information device stores, for example, a list of information indicating an access point corresponding to this first information device. Thereby, when the first information device is carried by a user and thus is required to have access to another access point, and when the stored list contains a determination as to whether or not information indicating another access point is contained therein, access information for the another access point is transmitted to the second information device from the first information device.

For example, the storage unit 1052 of the management device 105 may store access information and identification information of a plurality of access points 103. In this case, the management device 105 transmits the identification information of more than two accessible access points 103 as well as the device identification information. The first information device may display a list of the identification information of more than two access points 103 together with the list of the device identification information, and receive, from a user, a designation of which access point 103 is accessed by the second information device corresponding to "allowed." The user-designated information transmitted by the first information device contains information (for example, information indicating a correspondence between the information regarding the second information device corresponding to "allowed" and the identification information of the access point 103) indicating which access point 103 is designated to be accessed by the second information device corresponding to "allowed." On the basis of this information, the management device 105 transmits the identification information of the access point 103 corresponding to the second information device, to the second information device corresponding to "allowed."

In addition, for example, the management device 105 may be provided with a role management unit (for example, realized by the processor executing a computer program). The role management unit manages a role of each information device (whether it is the first information device or the second information device). The first information device 107M may transfer the role of the first information device (the role of the management device which designates whether the access of the second information device to the access point 103 is "allowed" or "denied") to the second information device. Hereinafter, a detailed example thereof will be described.

Figure 10:
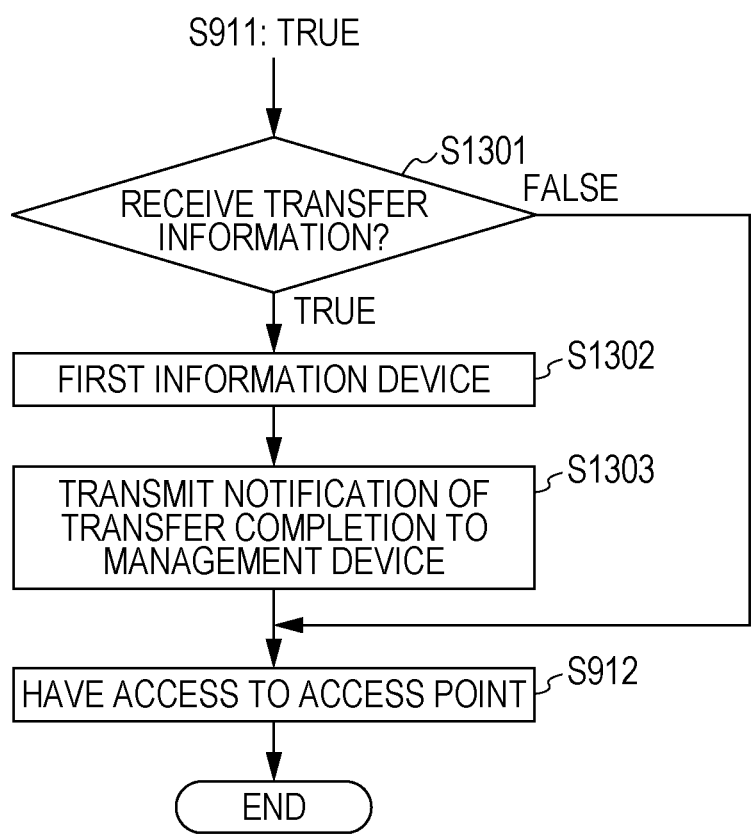
FIG. 10 illustrates a modified example of the processing B.

As shown in FIG. 10, if TRUE at step S911 in the processing B (refer to FIG. 6), steps S1301 to 1303 are performed prior to step S912. That is to say, the access information reception unit 1077 determines whether or not transfer information (information which means transferring the role of the first information device) is received in addition to the access information (S1301). If a result of the determination at step S1301 is negative (S1301: FALSE), step S912 is performed without steps S1302 and S1303, and if the result of the determination at step S1301 is affirmative (S1301: TRUE), steps S1302 and S1303 are performed. In other words, the information device executing this processing B becomes the first information device (for example, the role information stored at step S910 is changed into the information meaning the first information device) (S1302) and transmits a notification of transfer completion of becoming the first information device to the management device 105 (S1303). In addition, the above-described role management unit of the management device 105 receives the notification of transfer completion, and updates "the second" meaning the second information device into "the first" meaning the first information device in the classification of the device management information associated with the second information device which is the source having transmitted the notification. The device identification information transmission unit 1054 transmits device identification information to the information device corresponding to the classification "the first."

Figure 11:
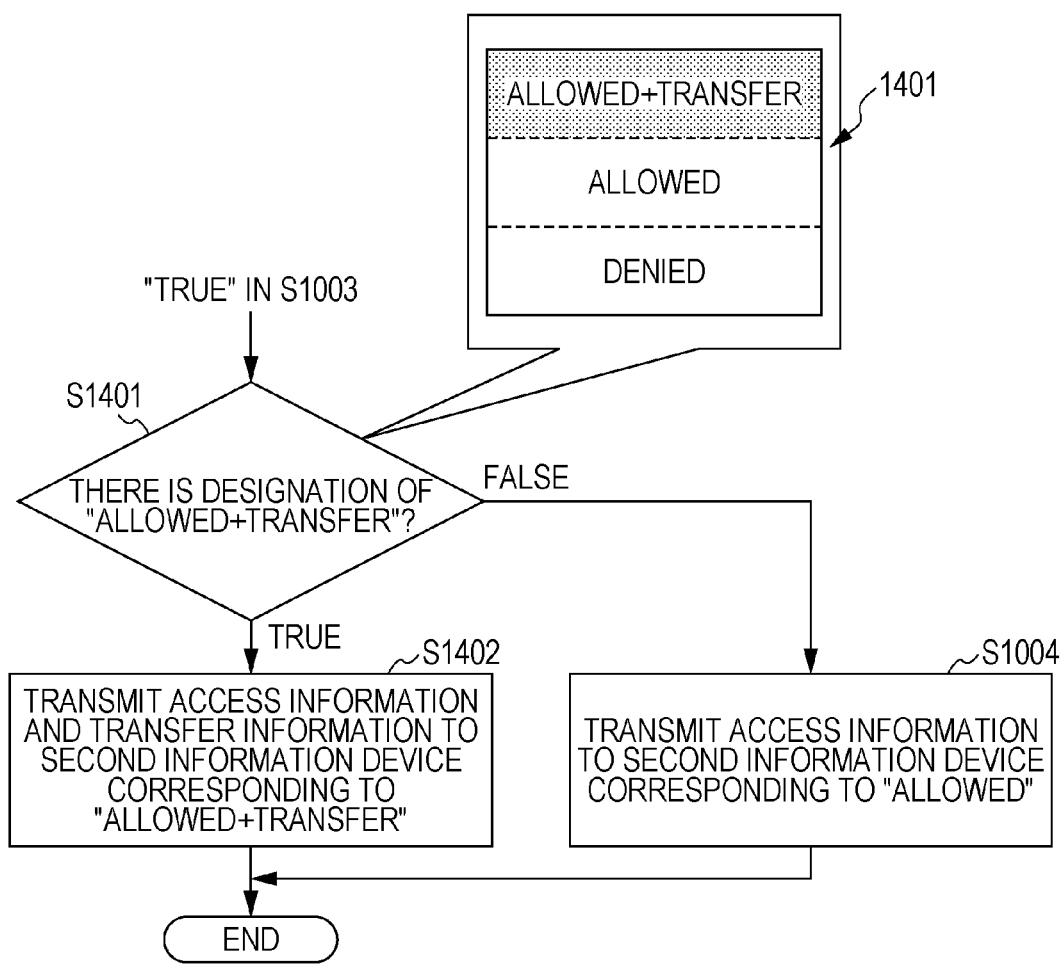
FIG. 11 illustrates a modified example of the processing C.

As shown in FIG. 11, if TRUE at step S1003 in the processing C (refer to FIG. 7), the user identification information reception unit 1056 determines whether information about the second information device corresponding to "allowed and transfer" is contained in the received user-designated information (S1401). If a result of the determination at step S1401 is affirmative (S1401: TRUE), the access information transmission unit 1057 transmits the transfer information as well as the access information to the second information device corresponding to "allowed and transfer" (S1402). In addition, a designation of "allowed and transfer" is performed, for example, as shown in FIG. 11, by the use of the tool 1401 which enables the selection of the option "allowed and transfer."

As shown in FIG. 12, after step S1103 in the processing D (refer to FIG. 8), the access allowance designation unit 1072 may receive the designation of "allowed and transfer" (S1501). The user-designated information transmission unit 1074 transmits the user-designated information (S1502), however, when a user designates "allowed and transfer," the user-designated information contains information about the second information device corresponding to "allowed and transfer." If "allowed and transfer" is designated (S1503: TRUE), the first information device becomes the second information device (for example, the role information stored at S904 is changed into information meaning the second information device) (S1504) and transmits a notification of transfer completion of becoming the second information device to the management device 105 (S1505). In addition, the above-described role management unit of the management device 105 receives the notification of transfer completion and updates "the first" into "the second" in the classification of the device management information corresponding to the first information device which is the source having transmitted the notification.

While preferred embodiments of the invention and several modifications have been described and illustrated above, it should be understood that these are exemplary of the invention and are not to be considered as limitation of the invention. Other modifications can be made without departing from the spirit or scope of the present invention.

The entire disclosure of Japanese Patent Application No. 2009-028909, filed Feb. 10, 2009 is expressly incorporated by reference herein.

What is claimed is:

1. A network access control system, comprising:

a first information device that has access to a relay device which relays communication in a communication network, by the use of access information, and performs communication via the relay device; and a management unit that authenticates the first information device and finds information devices, wherein when the found information device has no access to the relay device and is a second information device which is allowed to have access to the relay device by the first information device, the management unit transmits the access information to the second information device without a request for authentication, wherein the communication network is a wireless LAN (Local Area Network), wherein the relay device is an access point, wherein the management unit includes:

a device finding unit that finds information devices and receives device identification information of the information devices from the information devices;

a storage unit that stores management information including device identification information about each of found information devices;

a device determination unit that determines whether the found information device is the first information device which is an initially found information device or the second information device which is an information device found after the first information device is found, on the basis of the management information;

an authentication unit that when the found information device is the first information device, makes a request for authentication to the first information device and authenticates the first information device by the use of authentication information transmitted from the first information device in response to the request;

a device identification information transmission unit that when the found information device is the second information device, transmits device identification information of the second information device to the authenticated first information device;

a user-designated information reception unit that receives user-designated information including information about second information devices which are allowed to have access to the access point from the authenticated first information device; and an access information transmission unit that transmits the access information to the second information devices which are allowed to have access to the access point, the second information devices being specified based on the authenticated first information device or the user-designated information, wherein the first information device includes:

an authentication request reception unit that receives a request for authentication from the management unit;

an authentication information input unit that instructs a user to input authentication information in response to the request for authentication;

an authentication information transmission unit that transmits the authentication information input by the user to the management unit;

an access information reception unit that receives the access information from the management unit;

an access unit that has access to the access point by the use of the access information;

a device identification information reception unit that receives device identification information of the second information device from the management unit;

an access allowance designation unit that displays the received device identification information of the second information device and receives an access allowance designation which is a designation of whether or not the second information device corresponding to the displayed device identification information is allowed to have access to the access point by the user; and a user-designated information transmission unit that transmits user-designated information indicating the access allowance designation to the management unit, and wherein the second information device includes:

an access information reception unit that receives the access information from the management unit; and an access unit that has access to the access point by the use of the access information.

2. The network access control system according to claim 1, wherein the access allowance designation unit further enables receiving a designation of second information devices to which a role of the first information device is transferred, in addition to the access allowance designation, wherein the user-designated information includes transfer information which is information indicating that the second information device is designated as a transfer destination of the role, the second information device being allowed to have access to the access point, wherein the management information includes information indicating whether an attribute of each information device is the first information device or the second information device, wherein the management unit further includes a role management unit, wherein the role management unit changes an attribute for the second information device corresponding to the transfer information into an attribute meaning the first information device and changes an attribute for an information device which has been managed as the first information device into an attribute meaning the second information device, wherein the device identification information transmission unit of the management unit transmits device identification information of the second information device to the information device corresponding to the attribute meaning the first information device, and wherein the authentication unit of the management unit makes no request for authentication to the second information device corresponding to the transfer information, and the access information transmission unit of the management unit transmits the access information to the second information device.

3. The network access control system according to claim 1, wherein the management unit receives, from the found second information device, device identification information of the second information device, wherein the first information device displays the device identification information of the second information device received by the management unit and receives an access allowance designation which is a designation of whether or not the second information device corresponding to the displayed device identification information is allowed to have access to the relay device, and wherein the allowed second information device is a second information device which is designated by a user in order to be allowed to have access to the relay device.

4. The network access control system according to claim 1, wherein the first information device receives, from a user, a designation of a specific second information device, among the displayed second information devices corresponding to the device identification information, which is a transfer destination of a role as the first information device and is allowed to have access to the relay device, and wherein the management unit transmits the access information to the specific second information device without a request for authentication, and manages the specific second information device as the first information device and further manages the information device managed as the first information device, as the second information device.

5. A network access control method, comprising:

finding, by a management unit, a first information device which has access to a relay device which relays communication in a communication network by the use of access information and performs communication via the relay device;

finding a second information device;

receiving device identification information of the second information device from the second information device;

displaying device identification information about the second information device which has no access to the relay device and receiving, from a user, an access allowance designation which is a designation of whether or not the found second information device is allowed to have access to the relay device by a first information device, transmitting the access information from the management unit to the second information device which is allowed to have access to the relay device by the user without a request for authentication; and having access to the relay device using the access information by the second information device, which has received the access information, wherein the communication network is a wireless LAN (Local Area Network), wherein the relay device is an access point, wherein the management unit includes:

a device finding unit that finds information devices and receives device identification information of the information devices from the information devices;

a storage unit that stores management information including device identification information about each of found information devices;

a device determination unit that determines whether the found information device is the first information device which is an initially found information device or the second information device which is an information device found after the first information device is found, on the basis of the management information;

an authentication unit that when the found information device is the first information device, makes a request for authentication to the first information device and authenticates the first information device by the use of authentication information transmitted from the first information device in response to the request;

a device identification information transmission unit that when the found information device is the second information device, transmits device identification information of the second information device to the authenticated first information device;

a user-designated information reception unit that receives user-designated information including information about second information devices which are allowed to have access to the access point from the authenticated first information device; and an access information transmission unit that transmits the access information to the second information devices which are allowed to have access to the access point, the second information devices being specified based on the authenticated first information device or the user-designated information, wherein the first information device includes:

an authentication request reception unit that receives a request for authentication from the management unit;

an authentication information input unit that instructs a user to input authentication information in response to the request for authentication;

an authentication information transmission unit that transmits the authentication information input by the user to the management unit;

an access information reception unit that receives the access information from the management unit;

an access unit that has access to the access point by the use of the access information;

a device identification information reception unit that receives device identification information of the second information device from the management unit;

an access allowance designation unit that displays the received device identification information of the second information device and receives an access allowance designation which is a designation of whether or not the second information device corresponding to the displayed device identification information is allowed to have access to the access point by the user; and a user-designated information transmission unit that transmits user-designated information indicating the access allowance designation to the management unit, and wherein the second information device includes:

an access information reception unit that receives the access information from the management unit; and an access unit that has access to the access point by the use of the access information.

\* \* \* \* \*